United States Patent [19]

Zeyra et al.

[11] 4,134,424
[45] Jan. 16, 1979

[54] TWO-WAY RELIEF AND CONTROL VALVES

[76] Inventors: Abraham Zeyra, 1512 S. Bedford, Los Angeles, Calif. 90035; Thomas Günzler, 16929 Escalon, Encino, Calif. 91436

[21] Appl. No.: 814,858

[22] Filed: Jul. 12, 1977

[51] Int. Cl.² .................. F16K 15/14; F16K 17/18
[52] U.S. Cl. .............................. 137/493; 137/853
[58] Field of Search ............................ 137/493, 853

[56] References Cited

U.S. PATENT DOCUMENTS

| 3,298,391 | 1/1967 | Savage | 137/493 |
| 3,384,113 | 5/1968 | Pennisi | 137/853 |
| 3,527,551 | 9/1970 | Kutik | 137/493 X |

Primary Examiner—Robert G. Nilson
Attorney, Agent, or Firm—Thomas Günzler

[57] ABSTRACT

A bi-directional fluid flow control valve is provided with a spool-like valve body with a circumferential relief in its periphery bounded by a seal disk and by a reduced-diameter portion of the valve body, with a substantially tubular, elastic membrane stretched over the aforementioned portion and the seal disk, spanning the relieved portion. A flow channel penetrates the valve body centrally from the end closest to the reduced-diameter portion, and communicates with said relief via radial passages. Pressure differentials in either sense across the tubular membrane distort the membrane in such a manner that a flow passage is opened across the valve. When the pressure in the relieved groove is greater than on the outside of the membrane, the latter lifts from the seal disk. When the external pressure is greater, the membrane collapses into the relief groove, allowing flow through channels milled in the inner face of the seal disk.

10 Claims, 13 Drawing Figures

TWO-WAY RELIEF AND CONTROL VALVES

BACKGROUND OF THE INVENTION

The invention relates to non-return valves; it relates, more particularly, to such valve provided with a reverse flow capacity under controlled conditions of adverse pressure differential.

Non-return valves employing elastically deformable membranes are known in the art. Such valves are commonly employed in circumstances where purely unidirectional flow conditions are to be governed, such as the discharge valves of positive displacement air compressors. Typically, a flat metallic spring is arranged to be preloaded agains the periphery of an orifice cut into a backing plate, with the spring secured to the backing plate along one edge. When the pressure below the orifice exceeds that equivalent to the preload, the spring deflects away from the seat and allows flow, when the pressure differential is opposite, flow is interdicted.

In many circumstances, of which the inflation of tires and other inflatable pneumatic artifacts is only one example, it is highly desirable to provide a non-return valve which acts in a uni-directional manner during the actual inflation process but which also permits reverse flow should it occur that the inflation pressure exceeded that desired for safe operation. Such circumstances frequently occur during the mounting of tires on their rims; the installer, desirous of ensuring a proper seating of the tire beads against the rim, inflates the tire to the maximum available in his pressure line. Since this pressure is commonly much greater than the permissible inflation pressure, it is not uncommon that the tire, or the rim, disintegrate in the course of this procedure.

Not only is this condition wasteful, it is also dangerous. In some instances — commanded by the General Industry Safety Orders of the State of California, for example — inflation of high-pressure (commonly truck) tires takes place in a metal cage, so that flying fragments may be safely retained.

Such accidents can be, however, much more readily prevented by the provision of a valve which would automatically relieve excessive pressures, during, or immediately after, the inflation process.

Such valves, permitting flow in either direction in the presence of appropriate pressure differentials, can also find application in control systems based on the manipulation of hydraulic or pneumatic pressure in a circuit; such function can be developed by the use of two conventional relief valves acting in opposition, but it would be of great benefit to be able to use a single component to achieve the desired end.

It is, therefore, the primary object of the invention to teach the construction of a two-way relief valve.

It is also an object of the invention to provide a charging valve for inflatable artifacts which is capable of relieving excess inflation pressure and reliably seal the artifact upon the attainment of the desired pressure level.

It is also an object of the invention to provide a flow control valve capable of differential action which is simple in construction and reliable in use; and in which the principal control element is a tubular, elastically-deformable membrane coacting with a circumferential sealing edge on a disk.

SUMMARY OF THE INVENTION

The above objects, and other objects and advantages which shall become apparent from the detailed description of the preferred embodiment of the invention, are attained in a device incorporating a substantially tubular valve body and a tubular, elastic sealing membrane.

The aforementioned valve body is provided with a central passage communicating via suitable flow channels with a circumferential groove in the outer face of the valve body. The central passage is open to one end of the valve body and closed at the other, suitably comprising a blind bore. The valve body at the far side, furthest from the open central passage end, is formed into a sealing disk provided with a sharply defined largest diameter. This largest diameter may be created by chamfering or contouring the periphery of the sealing disk.

The tubular sealing membrane is constructed with an inner diameter somewhat smaller than the largest diameter of the sealing disk, and is drawn over the valve body so that it extends beyond the limits of the circumferential groove. At its end remote from the sealing disk, the membrane is fastened to the valve body. This joining of the membrane may be accomplished by an adhesive bond to the valve body, by welding, brazing or soldering, or by the use of an external clamp, as appropriate for the materials and dimensions employed.

The end of the tubular membrane overlapping the sealing disk is left unsupported; consequently the presence of a pressure differential across the membrane portion overlying the circumferential groove in the valve body will tend to deform the membrane from its as-assembled state. The direction of deformation will depend on the sense of the pressure difference, its extent, on the magnitude of the pressure difference. When the pressure inside the volume defined by the groove and the membrane is greater than that prevailing on the outer surface of the tubular membrane, the latter will tend to expand and to lift off the sealing disk. When the pressure differential is opposite in sense, the membrane will tend to collapse into the groove itself.

That face of the sealing disk forming a boundary of the circumferential groove is scallopped or sculptured in such a manner that the inward deformation of the membrane will uncover a plurality of flow channels between the groove and what was previously described as the largest diameter of the sealing disk.

In either mode of deformation of sealing contact between the tubular membrane and the sealing disk is broken and flow takes place, impelled by the existence of the pressure differential, provided that the valve body had been installed in a boundary wall between regions of differential pressure.

The opening point of the valve in either direction is determined by the initial preload between the sealing disk and the membrane, by the stiffness of the membrane, by the unsupported span over the width of the circumferential groove in the valve body, and by other factors at the disposal of the designer.

It is generally foreseen that the valve body shall be machined or molded from rigid materials, while the membrane is cut or molded from elastic tubing, or made from plastics or metals with the required resilience.

BRIEF DESCRIPTION OF THE ACCOMPANYING DRAWINGS

The preferred embodiment, and variants thereof, are described in detail, below, with reference to the accompanying drawings, in which.

Figure 7A:
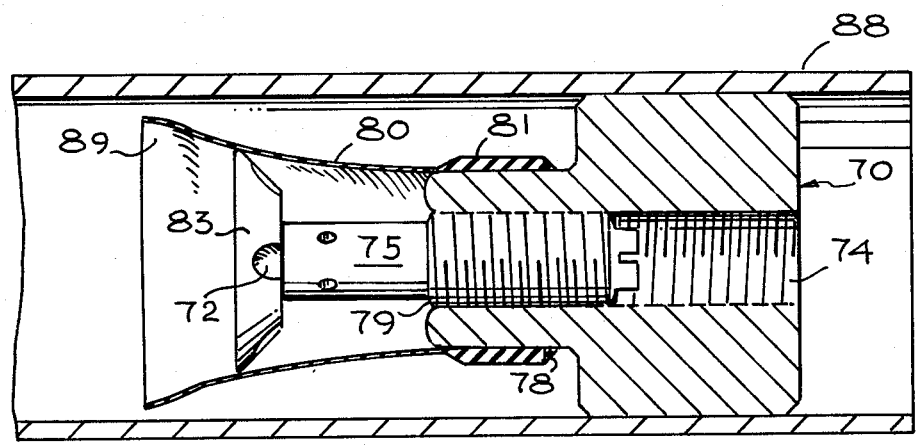
Figure 7B:
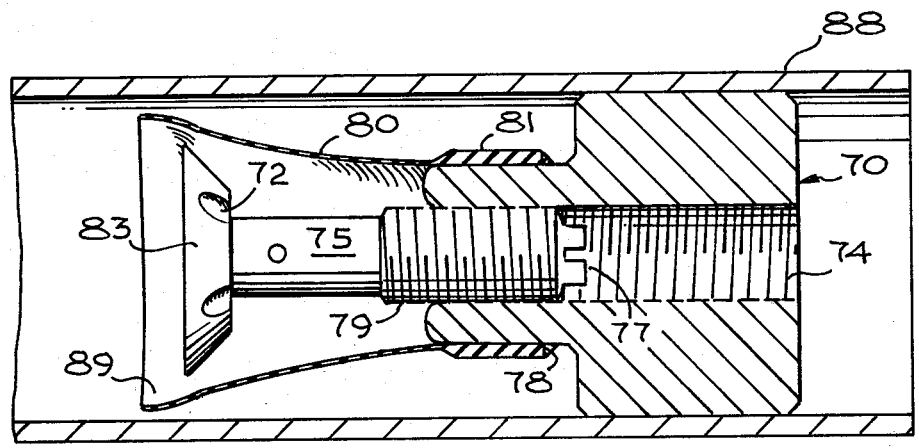
Figure 8:
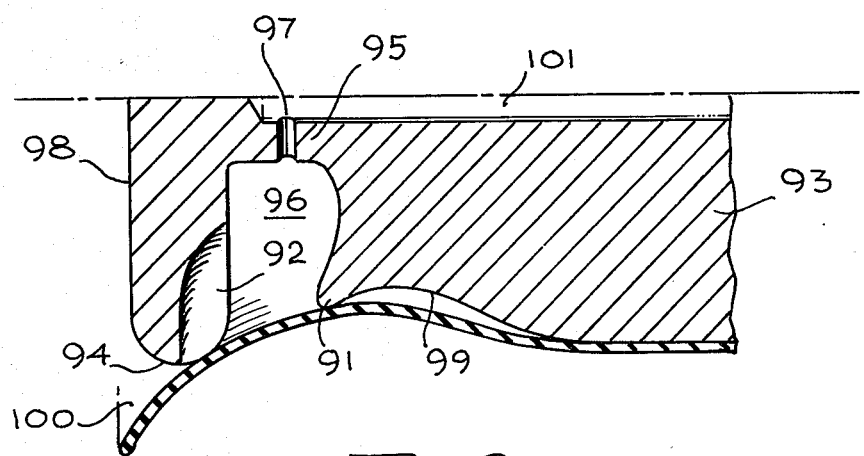

FIGS. 7A and 7B are lateral sections through a two-way control valve of the invention, utilizing a two-piece valve body and allowing for the adjustment of the operating points of the valve membrane to differential pressure in either direction, with FIG. 7B showing a condition wherein the valve is rendered temporarily inoperative by such adjustment; and FIG. 8 is a partial; transverse section through another embodimentof the two-way control valve of the invention, showing a contoured valve body of the support of the tubular, elastic membrane therein when in the reverse-flow mode.

DESCRIPTION OF THE PREFERRED EMBODIMENT

Figure 1A:
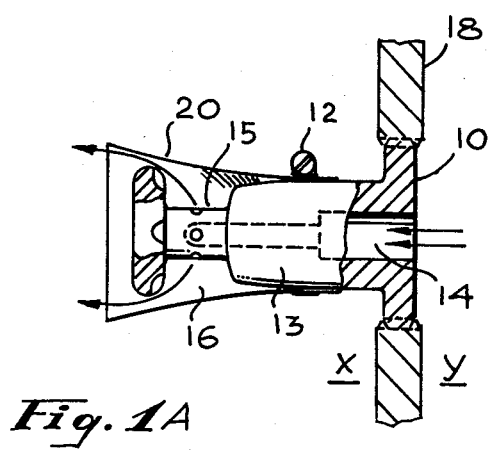
FIGS. 1A, 1B and 1C are lateral views of a two-way flow control valve of the invention — in differing control states and with varying degrees of sectioning of the valve body — illustrating the mode of operation of a valve of the invention.
Figure 1B:
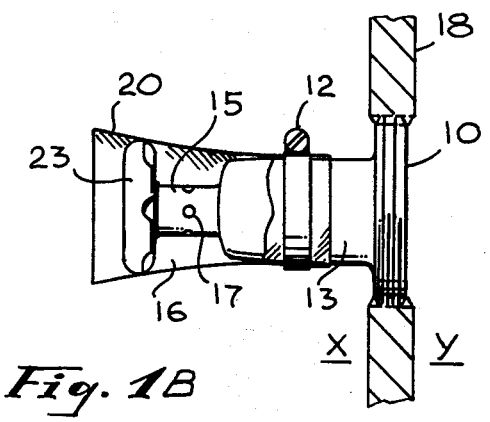
Figure 1C:
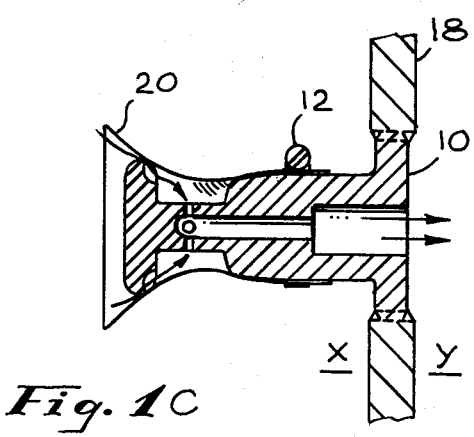

FIGS. 1A, 1B, and 1C show lateral views of a valve assembly constructed in accord with the principles of the ivention in varying states of section; the principal components of the valve assembly include a valve body 10 a tubular membrane 20 and a clamp 12 securing the membrane to a reduced-diameter portion 13 of the valve body 10. The valve assembly is secured in an orifice piercing a wall 18 which separates two regions, designated by the letters x and y of differing pressure. For illustrative purposes only, the region x may be considered a pressure vessel which is to be charged with a medium issuing out of the region y.

A valve disk 23 is secured coaxially to the valve body 10 by a shank portion 15, whose diameter is smaller than the diameters of the adjoining valve disk 23 or the body portion 13, so that, with the tubular membrane 20 drawn over these parts of the valve, and secured in place by clamp 12, an annular space 16 is defined around the circumference of the chank 15.

The valve body 10 is penetrated by a blind bore 14 which communicates with the aforementioned annular space 16 via radial orifices 17 piercing the shank 15. Given these flow passages the annular space 16 forms part of the pressure region y, sealed from the region x by a preload induced between the membrane 20 and the outermost edge of the seal disk 23. In the embodiment illustrated in the views of FIG. 1, the edge of the seal disk is defined by a substantially semi-circular arc 24 whose major diameter 25 defines the circular sealing contact with the tubular membrane 20.

FIG. 1A illustrates the action of the valve when the pressure in the region y is substantially greater than that existing on the other side of the barrier 18. The pressure differential tends to expand the tubular membrane 20, in those regions, overlapping the valve disk 23, where the clamp 12 does not prevent its distention, so that the seal at the diameter 25 is broken and a small peripheral flow passage is created. Fluid from the region y flows, inpelled by the existence of the pressure differential, into the region x, until such time as the pressure differential across the valve disk is reduced to a valve too small to sustain the elastic deformation of the tubular membrane into the condition shown in FIG. 1A. As the pressure differential is reduced the membrane contracts, until the sealing relationship with the seal disk 23 is re-established and flow ceases. This, quiescent state, of the valve assembly is shown in FIG. 1B.

Should, however, a differential pressure be established between the regions separated by the valve assembly in which the pressure in region x is materially greater than the corresponding pressure in region y, the membrane 20 is subjected to an inward loading over the annular space 16 and tends to deform inwardly towards the shank portion 15. Since the outermost edge of the membrane 20, cantilevered over the lip of the seal disk 23, is neither restrained by any portion of the valve assembly nor loaded in any manner, it tends to slide over the outermost diameter 25 of the disk and permit the deformation of the central portion of the part into the condition shown in FIG. 1C.

As the membrane slides over the seal disk, its point of contact with the latter member tends to shift toward the space 16, and off the diameter 25. The inner face of the seal disk 23 is sculptured by a plurality of cutouts 22 which terminate a short distance inward of the diameter 25. In this context the term 'inward' is meant to indicate any location or movement toward the annular space 16. Consequently, as the membrane is collapsed toward the shank portion 15, the point of contact with the seal disk 23 will, at some point, overlap the cutouts 22, and establish corresponding flow passages for fluid movement from the region x toward the region y. This flow will continue until such time as the pressure differential between the two regions is reduced below that required to accomplish the elastic deformation of the membrane 20, re-establishing the sealed condition shown in FIG. 1B.

Figure 2A:
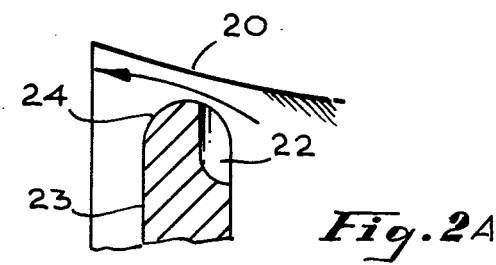
FIGS. 2A, 2B and 2C are fragmentary views of the interaction of the sealing disk and tubular membrane of the embodiment of FIG. 1.
Figure 2B:
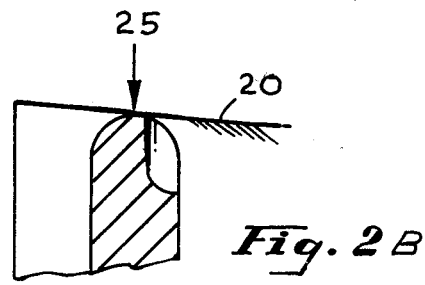
Figure 2C:
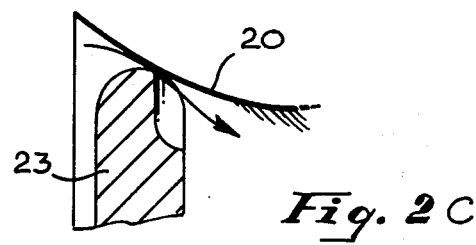

The critical interaction of the tubular membrane 20 and the seal disk 23 is further illustrated in FIGS. 2A, 2B, and 2C, whose conditions correspond to the three operating conditions depocted in FIG. 1. In FIG. 2A the inside of the membrane 20 is exposed to a greater pressure than outside, and results in an expansion of the membrane to allow flow in the sense of the pressure differential. In FIG. 2B the pressure levels are equal, or, alternatively, the pressure differentials in either direction are smaller than necessary to obtain a significant deformation of the membrane. In FIG. 2C, the external pressure is higher than the internal one, and the deformation of the membrane 20 allows flow inwardly across the tip of the seal disk 23, through milled-out pockets 22.

Figure 3:
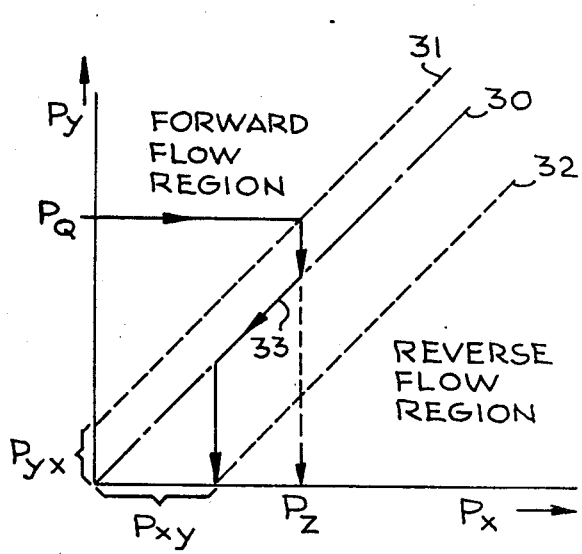
FIG. 3 is graphical representation of the control action of the valve of the invention, represented by limit lines on a map of the possible pressure level states at the two ends of the valve.

FIG. 3 is a graph representing the operation of the valve of the invention. The coordinate axes, labelled $P_x$ and $P_y$, represent the absolute values of the pressures existing in the regions x and y separated by the valve. A line 30 bisects the coordinate axes and represents a condition in which the two regions are at the same pressure level, as perceived by the valve. The pressure differential required to unseal the valve membrane by expansion is designated $P_{yx}$ and the operating line corresponding to this limiting flow condition is marked with the index 31. The opposing pressure differential required to collapse the membrane and allow flow inwardly across the seal disk is designated $P_{xy}$, and this limiting flow condition is shown by the line 32. Referring to FIG. 3, it is evident that for any pressure conditions whose co-ordinates would lie above the line 31, fluid flow will be permitted from the region y into the region x; while for any pressure conditions below the line 32 the flow will reverse. In the region intermediate between the line 31 and 32 no flow will result, as long as the designated pressure levels are maintained.

One possible working cycle is illustrated on FIG. 3, indicating the use of the valve as a charging valve for a confined region x from a pressure source y operating at a pressure $P_O$. Assuming that the initial pressure in x is substantially below $P_O$, fluid flow will be permitted until the pressure level inside the confined region reaches a value indicated at $P_Z$, equal to $P_O$ minus $P_{yx}$. At this point flow will cease since the membrane will reseal and isolate the two regions. If the charging source is then removed from contact with the valve, in the manner of removing the air pressure fitting from a tire valve, the valve will be exposed to a new working condition with $P_Z$ on the inside and a much lower pressure on the outside. Under this condition the valve will reopen in the reverse flow mode and, following along operating line 33 (in a purely illustrative sense) remain open until the differential pressure is reduced to the valve of $P_{xy}$.

This is illustrative of one of the advantages of the valve of the invention when employed as a control valve for inflatable artifacts; such as tires, air mattresses, and others, which may have a predetermined working pressure. This working pressure is readily made equal to the reverse flow opening pressure $P_{xy}$ and the artifact may be inflated from an uncontrolled, or ungauged, source as long as the latter does not provide a pressure which, in itself, can cause damage to the inflatable artifact. At the end of the charging process the valve will automatically allow the escape of sufficient fluid to maintain the artifact at the designed operating pressure level.

Figure 4:
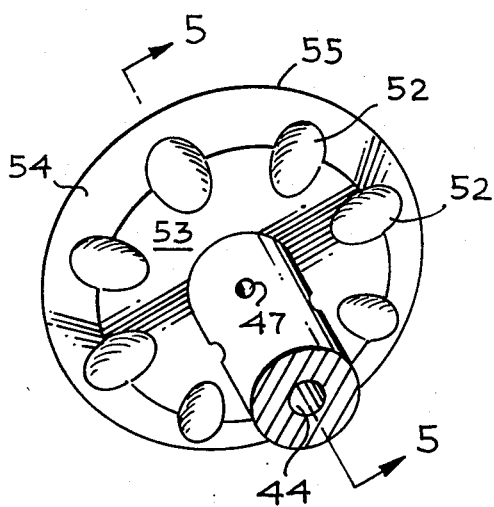
FIG. 4 is a fragmentary, perspective view of a valve body employed in a control valve of the invention.
Figure 5:
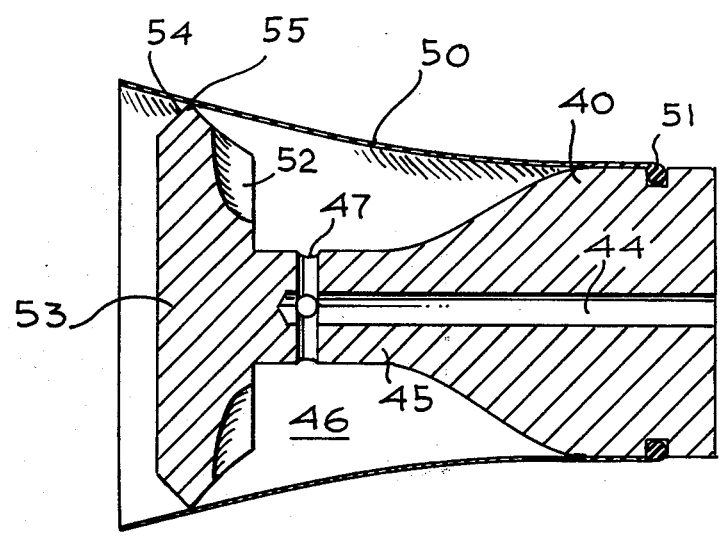
FIG. 5 is a lateral section — taken along the alignment indicated by section line 5—5 — of a valve employing the valve body shown in FIG. 4

An alternative embodiment of the valve of the invention is shown in FIGS. 4 and 5, of which the latter is a section of the former, taken along section line 5—5. A valve disk, or seal disk, 53 is shown whose sealing edge 55 is defined by ramps 54. The inner face of the disk 53 is sculptured by the provision of indentations 52, approaching, but not undercutting the sealing edge 55. The seal disk is attached to a valve body 40 by a shank portion 45, with a sealing membrane 50, substantially in the form of a truncated cone with a small divergent angle, superimposed on annular space 46 surrounding the shank 45. The membrane 50 is provided with an enlarged peripheral bead 51 at its smaller end. The bead 51 is retained in a co-operating groove in the outer surface of the valve body 40.

A central channel 44 in the valve body is connected with the annular space 46 via orifices 47. The stem of the valve body 40 is smoothly blended toward the shank portion 45, to act as a support for the membrane 50 in the reverse flow mode; this is particularly important if the membrane is constructed from a material with limited elastic range, such as a metal tube, since excessive deformations may lead to plastic flow and a reduced sealing preload upon the removal of the differential pressure. The problem of permanent deformation is generally less severe with forward flow, since an increase in the pressure level in the annular volume 46, or its equivalents, rapidly increases the flow area around the tip of the seal disk so that the pressure drop through the channel 44 and orifices 47 increases until a balance is attained, normally at a manageable pressure level in the region 46.

Figure 6:
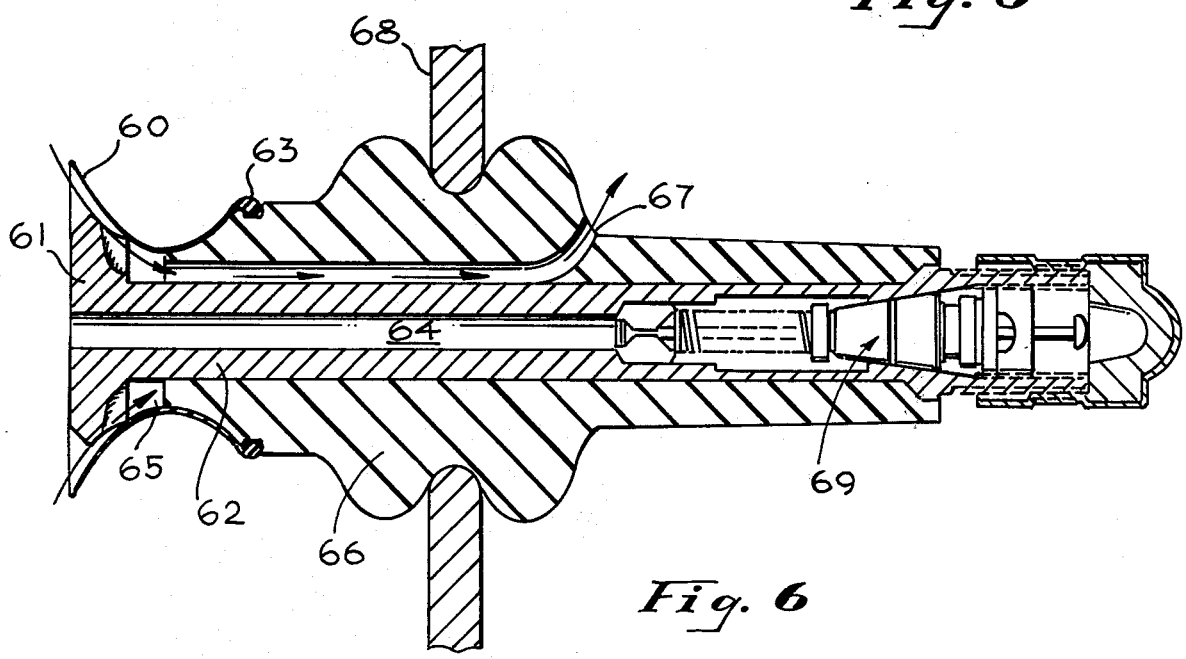
FIG. 6 is a lateral section through a tire inflation valve employing, in combination, a tire valve of the prior art and a control valve of the invention acting as a relief valve in conjunction therewith.

FIG. 6 is a transverse section of a valve with the general characteristics and features of the embodiment illustrated in FIGS. 4 and 5, employed as a relief valve for pneumatic tires. It is well known in the art of tire inflation that one of the persistent hazards encountered is the overinflation of such tires; due to ignorance, lack of skill, or the lack of suitable gauges to determine the actual pressure within the carcass. In the embodiment of FIG. 6 the valve of the invention is employed as a relief valve, installed in a unit assembly with a conventional tire valve 69. Since this tire valve forms no part of the invention it will not be described in any detail, its construction and operation is well known in the art. While the valve 69 could be entirely dispensed with, it provides the requisite inflating and deflating provisions adapted to conventional inflation and service equipment. The valve 69, as well as the relief valve described below in detail, are mounted in a basic assembly of a metal tube, with a central channel 64, and a molded-on rubber body 66 with an integral grommet to sealingly engage an appropriate orifice in the wheel 68 upon which tire to be inflated is mounted.

At the inboard end of the valve assembly a seal disk 61 is provided upon which a tubular membrane 60 is disposed, with its inboard end, provided with a bead 63, engaged in a mating groove on the outer periphery of the body 66. The seal disk 61 is spaced from the end of the body 66, thereby forming an annular space 65, analogous to the space 46 in FIG. 5, from which a channel 67 issues interconnecting the space 65 with the atmosphere.

In FIG. 6, the tubular membrane 60 is shown in a collapsed condition, allowing air from the inside cavity of the tire to escape to the atmosphere, due to the existence of an overpressure condition brought about by the overinflation of the tire through the valve 69. In this instance, the dimensions of the valve have been so selected that the reverse flow differential $P_{xy}$ corresponds to the maximum inflation pressure recommended for the tire mounted on wheel 68. The escape of air through the channel 67 not only relieves the excess pressure, but also alerts the person charged with inflating the valve that he has completed the job; the hiss of the escaping air, if necessary reinforced by a whistle-like constriction at the outboard end of the channel 67, providing an unmistakable signal that the tire carries more than sufficient air pressure.

When the tire pressure has been reduced to the desired level, the membrane assumes a position corresponding to that in FIG. 5, and the valve seals the tire from the atmosphere. For this use, the leak-tightness offered by the valve of the invention is of the greatest benefit. This leak-tightness stems from the inherent uniformity of the sealing pressure between the membrane 60 and the seal disk 61, or their equivalents, due to the self-centering propensity of the former with respect to the latter.

FIGS. 7A and 7B are transverse sections through yet another embodiment of the valve of invention, allowing for an adjustable range of the actuating differential pressures $P_{yx}$ and $P_{xy}$ to be set at the discretion of the user, and also allowing for an ajustment position in which the valve is placed in a pressure release mode, permitting the pressures on either side to be equalized.

In FIG. 7A a valve body 70 is shown, set into a tubular channel 88 in such a manner that the two portions of that channel, on either side of the valve assembly, are sealed from each other around the periphery of the valve body. A central orifice 74 in the valve body 70 is threaded to accept the threaded shank 79 of a valve stem 75. The end of the valve stem remote from the valve body 70 carries an integral seal disk 83, formed with a chamfered edge on its inward face and a plurality of milled pockets 72 in that chamfer. The relative axial alignments of the valve body and the valve stem are adjustable, for example by means of a screwdriver engageing a slot 77 in the end of threaded portion 79.

Circumferentially surrounding the seal disk and valve stem a tubular membrane 80 is provided, with a tapered central portion, an outboard end portion 89 with a steeper taper, and a thickened inboard portion 81. The thickened portion 81 is welded or glued to the valve body 70 along a circumferential seam 78.

The operation of the valve is identical to that of the embodiments described above, with the sole exception that the magnitude of the differential pressure levels $P_{yx}$ and $P_{xy}$ can be varied by repositioning the valve stem within the threaded bore 74. The closer the seal disk 83 is brought to the valve body 70, the higher the pressure differentials required to cause a deformation of the membrane 80, in either flow direction. The farther it is located, the lower the pressure differentials at which the valve will open. In an extreme position, illustrated in FIG. 7B, with the seal disk 83 within the region of the enlarged taper 89 of the membrane 80, the sealing relationship between these components is broken and unrestricted flow is permitted in either direction. This latter condition corresponds to the pressure release mode of an automobile tire inflation valve, or its equivalents.

The embodiment of FIG. 8, a partial transverse section through a two-way control valve, employs a tubular membrane 100 of constant diameter. In this embodiment a seal disk 98 is used, which is somewhat larger in diameter than the portion 93 of the valve body upon which the membrane 100 is located; the relative enlargement of diameters representing the elastic deformation of the membrane required to attain the desired sealing pressure between the peripheral portion 94 of the seal disk and the membrane. A shank portion 95 of the valve body is provided with radial passages 97 communicating with an internal flow channel 101. The valve portions 93, 95 and 98 define an annular volume 96 overlain by the membrane 100. That portion of the valve body 93 proximate to the annular space 96 is formed into a curved projection 91, adjacent to a bay 99 in the external periphery of the valve body. This contouring of the valve body 93 is designed to provide support for the membrane 100 under operating conditions when the external pressure exceeds the internal pressure in the space 96 and the membrane tends to deform into the condition shown in FIG. 8.

Many variations are possible in the detailed construction of the valve of the invention, beyond those illustrated herein. Various metallic and non-metallic materials may be utilized to manufacture the valve body and the seal membrane; certain elastomers — natural and synthetic rubbers — are particularly adapted for the latter use.

The valve may be constructed essentially as an inflation valve with bleed-off capacity in the case of overinflation, as a pure pressure relief valve, as a non-return valve with reverse flow capacity for control applications in hydraulic and pneumatic circuits, and for other, cognate uses.

All such constructions, materials and uses are deemed to be encompassed by the disclosure herein, with the invention delimited solely by the appended claims.

We claim:

1. A bi-directional fluid flow control valve, comprising:
    an elongated, substantially cylindrical valve body with an internal channel open to one end thereof, and closed at the other end;
    a circular sealing disk projecting from the other end of said valve body, with the periphery of said sealing disk formed to define a continuous peripheral strip at the largest diameter thereof;
    a support disk on said valve body, spaced from said sealing disk;
    orifice means penetrating said valve body and communicating with said internal channel, at a position intermediate between said sealing disk and said support disk;
    a substantially tubular, elastic membrane sheath drawn over said valve body, in sealing engagement with said largest diameter of said sealing disk and with said support disk;
    means for affixing said membrane sheath to said support disk; and
    substantially radial runnels in said sealing disk, sculpturing the face thereof proximate to said orifice means and extending radially to a position spaced from said largest diameter along said face.

2. The bi-directional control valve of claim 1, further comprising:
    means for securing said valve body in a flow channel separating two regions of fluid pressure.

3. The bi-directional valve of claim 1, wherein said elastic membrane sheath is constructed from an elastomer.

4. The bi-directional valve of claim 1, wherein said elastic membrane is constructed from a metallic alloy.

5. The bi-directional valve of claim 1, wherein said periphery of the sealing disk is formed into a semicircular arc tangent to the faces of said disk.

6. The bi-directional valve of claim 1, wherein said largest diameter is attained at the apex of a bilateral chamfer.

7. The bi-directional valve of claim 1, wherein said largest diameter is formed at the intersection of an outer face of said sealing disk and a chamfer toward said face proximate to said orifice means.

8. The bi-directional valve of claim 1, wherein said orifice means include at least one radially drilled channel intersecting said internal channel.

9. The bi-directional valve of claim 1, further comprising adjusting means for varying the spacing between said support disk and said sealing disk.

10. The bi-directional valve of claim 9, wherein said adjusting means include mating, threaded components.

* * * * *